Sept. 1, 1959

G. H. FRITZINGER 2,902,333

MOUNTING OF SHEET RECORDS

Filed Nov. 9, 1954

2 Sheets-Sheet 1

INVENTOR

George H. Fritzinger

INVENTOR

George H. Fritzinger

United States Patent Office 2,902,333

Patented Sept. 1, 1959

2,902,333

MOUNTING OF SHEET RECORDS

George H. Fritzinger, West Orange, N.J., assignor, by mesne assignments, to McGraw-Edison Company, Elgin, Ill., a corporation of Delaware Application November 9, 1954, Serial No. 467,770

6 Claims. (Cl. 346—138)

This record relates to phonographic machines which use a record medium in the form of a flexible sheet comprising magnetizable material, and which are provided with a revolvable record support adapted for carrying the sheet record in the form of a substantially closed loop. More particularly, the invention relates to novel arrangements for mounting a sheet record on a substantially endless supporting surface while confining the leading edge of the sheet record in a narrow transverse peripheral gap provided in the record support.

In the present type of sheet record machine the leading portion of the sheet record is attached to the record support to provide for drive of the sheet record in wrap-around relation to the support. As the support is advanced, a magnetic head is propelled slowly across the support so that it will scan a helical track on the sheet record with repeated crossing of the joint between the leading and trailing edges thereof. When the sheet record is removed from the support and laid out flat, the scanning track appears as a series of side-by-side parallel lines.

It is necessary that the sheet record be accurately located on the support so that the individual parallel lines will re-form the continuous helical track when a recorded sheet is mounted on a machine for playback or transcription. A satisfactory means for attaching the sheet record to the support comprises a pair of hooks projecting from the surface of the support to engage a pair of complementary drive holes in the leading corner portions of the sheet record, as shown for example in the Roberts Patent 2,653,819, dated September 29, 1953. This manner of attaching the sheet record to the support has the advantage that when a sheet record is placed into a definite loading position, wherein the leading edge overlies the record support, the hooks will pick up the record automatically as the support is advanced; and, reversely, upon placing a stripping plate in close proximity to the support and reversely rotating the support, the sheet record is stripped therefrom and disengaged automatically from the hooks.

An object of my invention is to provide for a safe mounting of a sheet record on an endless record-supporting surface of a dictating machine without incurring possible fouling of the leading edge of the sheet record on parts of the machine.

Another object is to provide an endless record support with means to confine the leading edge in a way to eliminate the need for an overlap joint between the trailing and leading edges of the sheet record.

Another object is to provide a sheet record mounting arrangement adapted to confine the leading edge of a sheet record in a narrow transverse peripheral gap provided in the record-supporting surface.

Another object is to provide a record support having means for concealing the leading edge of the sheet record while providing a substantially continuous peripheral surface for supporting the sheet record in wrap-around relation to the record support.

Another object is to provide a record support which has a substantially endless peripheral surface and which is provided with a movable transverse section adapted for introducing and confining a leading edge of the sheet record in a narrow slit of the record support.

Another object is to provide a revolvable record support adapted for carrying a sheet record in wrap-around relation thereto, which record support is provided with means for causing automatically a leading portion of the sheet record to be introduced into a narrow peripheral gap in the support as the sheet record is propelled from a loading position by the support.

Another object is to cause the leading edge of the sheet record to become concealed below the regular peripheral surface of the record support and to be released therefrom restrictively as incidents to propelling the sheet record by the record support in advancing and backspacing directions.

A particular object of my invention is to present the leading edge of a sheet record at or into a relatively wide slot in the record support as the sheet record is attached to the support, and to then substantially close the slot to complete substantially the regular peripheral surface of the record support while confining the leading edge of the sheet record below the periphery of the support.

A further particular object of the invention is to attach the leading portion of a sheet record to a rotatable transverse section of the record support and in then turning this section to feed the leading edge below the periphery of the support while completing its regular peripheral surface except for a narrow peripheral slit through which the leading edge extends.

These and other objects and features of my invention will be apparent from the following description and the appended claims.

In the description of my invention reference is had to the accompanying drawings, of which:

Figure 1 is a righthand side elevation with parts in section on the line 1—1 of Figure 2, showing a portion of a dictating machine having a record support for a sheet record with means for confining the leading edge of the sheet record in a narrow peripheral gap of the record support according to one embodiment of my invention, the confining means being herein shown in open position ready for attachment of a sheet record to the support;

Figures 1, 2, 3:
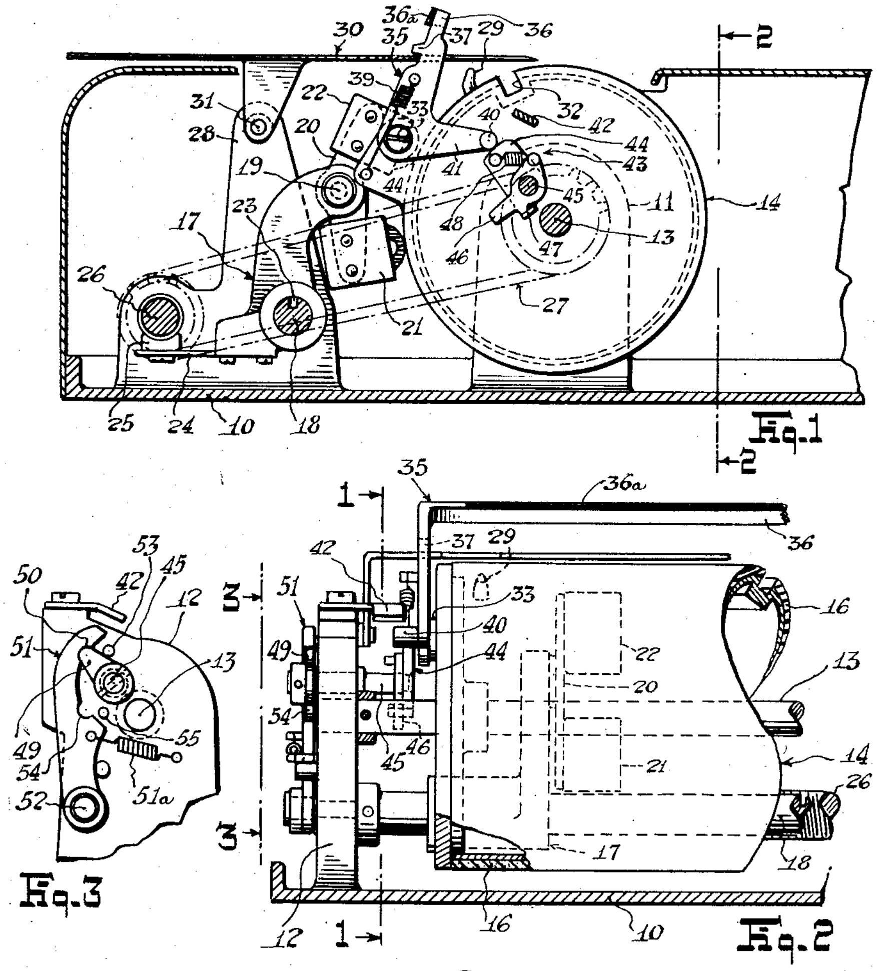
Figure 2 is a rear fractional view of this machine taken on the line 2—2 of Figure 1.
Figure 3 is a view taken on the line 3—3 of Figure 2 showing a detent mechanism for the above-stated confining means.

The sheet record recording and reproducing machine shown in Figures 1–4 comprises a base 10 provided with left and right upright standards 11 and 12. These standards have bearings for a shaft 13 on which is mounted a record support 14 having a substantially endless peripheral surface for carrying a magnetic sheet record 15, the support being shown for example in the form of a drum. This drum is provided with a yieldable peripheral covering 16 to provide a yieldable backing for the sheet record mounted thereon. The drum is driven in an advancing direction, which is a clockwise direction as it appears in Figure 1, but the drive mechanism therefor need not be herein described.

At the front of the drum there is a carriage 17 mounted slidably on a cross rod 18 for lateral movement along the drum. Pivoted at 19 to this carriage is a rocker beam 20 on one end of which is mounted an erase head 21 and on the other end of which is mounted a record-reproduce head 22. The carriage may be shifted forwardly and rearwardly to place the heads into and out of engagement with the record support, and for this purpose it is splined at 23 to the support rod 18 so that it may be shifted by turning the rod 18. Mounted on the carriage is a cantilever spring 24 carrying a feed nut 25 for engagement with a feed screw 26 concurrently as the heads are placed into engagement with the mounted record 15. This feed screw has a constant drive coupling with the shaft 13 as by means of a chain drive fractionally indicated at 27. The feed screw 26 and support rod 18 are mounted in suitable standards at their end portions, such as in the standard 28 at the left side of the machine shown in Figure 1.

The drum has radially-extending drive pins or hooks 29 at opposite ends thereof which are disposed in a common plane through the center of the drum. These drive pins are adapted to engage corresponding complementary drive holes in the leading corner portions of the sheet record 15 to drive the sheet record in wrap-around relation to the drum as the drum is advanced. In response to suitable biasing, the heads 21 and 22 engage the sheet record with necessary pressure to have a firm contact with the sheet record. When the drum is advanced, the carriage is moved progressively along the drum by the feed screw 26 to cause the heads to describe a helical track on the sheet record, with the erase head being in advance of the record head to erase any prior recording on the track being scanned. During reproducing, the erase head is disabled, but the means for so disabling the head as well as the audio circuits of the machine need not be herein described for the purposes of the present invention.

During the mounting and removing of the sheet record onto and from the drum the heads may be disengaged by shifting the carriage away from the drum. As the heads are so shifted out of engagement with the record, the feed nut is disengaged from the feed screw to free the carriage for manual movement along the drum.

To mount a sheet record on the drum the record is presented into a loading position across a loading and stripping plate 30. This plate is connected pivotally, for example at points intermediate its length, to side standards on the machine such as at 31 to the standard 28 at the left side of the machine. The plate 30 is held yieldably in a position wherein it is substantially tangential with the drum but the plate terminates short of the drum to have normally a clearance spacing therefrom. The rear end portion of the plate 30 has a width less than the distance between the drive pins 29 so that the plate will clear these pins as the drum is rotated. A proper loading position of the sheet record is one wherein the leading end portion of the record overlies the drum with the drive holes centered with radius lines of the drum at right angles to the record. Upon placing the sheet record in such loading position and thereupon advancing the drum, the hooks slidably engage side portions of the sheet record and deflect it upwardly until the hooks come into registration with the drive holes, whereupon the sheet record deflects downwardly by its weight and natural resilience to cause the sheet record to become attached to the drum. Upon further advancing the drum the sheet record is propelled in wrap-around relation thereto with circumferential freedom of movement from its leading to its trailing edges. When the heads engage the revolving sheet record they impose a drag resistance thereon tending constantly to tension the record about the drum from its leading edge to the points of its contact with the heads.

There are advantages in confining the leading edge of a mounted sheet record within a narrow transverse peripheral gap in the record support because then sheet records of very thin material may be used with assurance that the leading edge will not be fouled on any part of the machine, such for example as the heads, during the first revolution of the drum following the attachment of the sheet record thereto. In fact, not only is it then unnecessary that the heads be raised from the record during the operation of mounting a sheet record in wrap-around relation to the drum, but it is even no longer necessary to provide for an overlap joint between the leading and trailing edges since a simple butt joint is then sufficient. By my invention, I provide a confining means adapted to cause the leading edge of the sheet record to engage automatically a narrow peripheral gap in the drum as an incident to propelling the sheet record into wrap-around relation with the drum; and, conversely, I provide means for automatically disengaging the leading edge from this gap as an incident to reversely rotating the drum. These objectives may be accomplished by different mechanical arrangements within the compass of my invention, as will appear, but they have a common feature in that the record support is provided with a movable transverse section operable into an effective position to introduce the leading edge into the peripheral gap while completing substantially the regular peripheral supporting surface of the record support, and operable into an open or ineffective position to prepare the record support for the attachment of a sheet record thereto.

In the embodiment shown in Figures 1–4 the drum 14 is provided with a relatively wide slot 32 in advance of the drive pins 29 so that when a sheet record is attached to the drive pins the leading edge thereof will overlie at least partially this slot. Pivoted at 33 to radially-extending ears 34 on the end walls of the drum is a bail 35 having a cross member 36 for engaging this slot as the bail is swung inwardly into a closed position. When the cross member is in full engagement with the slot, the outer surface thereof, which is preferably covered with yieldable material **36*a*, forms an extension of the regular peripheral surface of the drum to complete the periphery of the drum except for a narrow slit 32*a*** at the side of the slot nearer the drive pins (Figure 4), which slit is the opening through which the leading portion of the sheet record extends when the record is mounted on the drum.

The starting or loading position of the drum is one wherein the bail 35 is in an open position overlying the loading plate 30 and wherein the drive pins 29 and slot 32 are in positions underlying this plate as shown in Figure 1. This starting position may be defined, for example, by the abutment of a tooth 37 on the bail against an edge of the loading plate as shown in Figure 1. The bail is retained reliably in open position by an over-center spring 39. However, upon advancing the drum from its starting position through a distance slightly more than that necessary to bring the drive pins 29 into engagement with the drive holes of a sheet record mounted in loading position, a pin 40 on a bell crank arm 41 of the bail 35 strikes a stationary cam 42 mounted on the standard 12 (Figure 3) and trips the bail over-center. Once the bail is moved over-center it is propelled onwardly until the cross member 36 fully engages the slot 32. As the cross member engages the slot it bends the leading end portion **15*a* of the sheet record into the narrow slit 32*a* aforementioned. Also, as the bail is so moved onwardly past a center position, the pin 40 is moved free of the cam 42. Upon advancing the drum one revolution following attachment of the sheet record thereto the sheet record is wrapped around the drum with the trailing edge coming into a nearly butt relationship with the crease line of the record where it emerges from the slit 32***a*.

To remove the sheet record the drum is turned reversely to cause the plate 30 to engage the under side of the trailing edge of the record and to strip it from the drum. In order that the bail 35 will be opened automatically at the end of such stripping operation, a trip mechanism 43 is provided on the inner side of the right standard 12.

The trip mechanism 43 comprises an abutment arm 44 staked to a shaft 45 which is journaled in the standard 12 as shown in Figure 2. Pivoted on this shaft in juxtaposition with the abutment arm is a trip lever 46 which is biased counterclockwise into a limit position defined by abutment of the lever against a lug 47 on the abutment arm, the biasing being effected by a tension spring 48 connected between the lever and arm. During normal operation of the machine the trip mechanism 43 is detented in the position shown in Figure 4 by means of a detent lever 49 pinned to the shaft 45 at the right side of the standard 12. The tip of this detent lever engages a notch 50 in a catch plate 51 pivoted at 52 to the standard 12 and urged lightly by a tension spring 51*a* against the detent lever. Once during each revolution of advance movement of the drum the pin 40 strikes the trip lever 46 and moves it clockwise until it clears the lever whereupon the lever then snaps back into its position shown in Figure 4. Although this action imposes a clockwise torsional force on the shaft 45, the shaft is held from turning in response thereto by abutment of the detent lever 49 against a stop pin 53 on the standard 12.

When the drum is reversely rotated to strip a sheet record therefrom, the pin 40 strikes the trip lever 46 from the reverse side as the plate 30 engages the underside of the mounted record. The bail 35 is biased with sufficient force to enable the pin 40 to shift the detent mechanism 43 in a counterclockwise direction into its other position shown in Figure 1 as the drum is so turned in a reverse direction. As the trip mechanism is so shifted, the detent lever 49 engages a second notch 54 in the catch plate 51 and comes into abutment with a second stop pin 55 on the standard 12. By this counterclockwise shifting of the trip mechanism 43 the abutment arm 44 thereof is moved into the path of the pin 40 of the bail 35. The width of this abutment arm is such that as the drive pins 29 near the stripper plate 30 during the final portion of the removal of a sheet record from the drum, the pin 40 strikes the right side of the abutment arm and causes the bail 35 to be shifted over-center towards its open position. During the opening movement of the bail the pin 40 is shifted radially outwardly beyond the end of the abutment arm but this does not occur until the bail has been moved over-center. Once the bail has been moved over-center it is moved onwardly to fully open position by the over-center bias spring 39 with the result that the parts then come into the positions shown in Figure 1.

Figure 4:
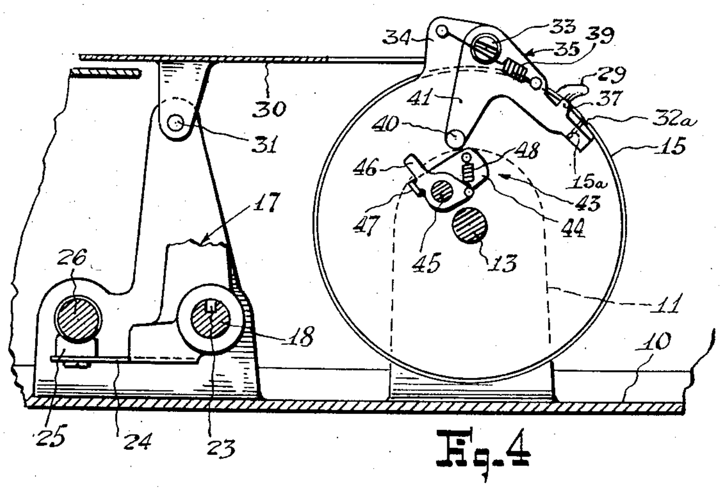
Figure 4 is a fragmentary view similar to Figure 1 but showing the sheet-record edge-confining means in closed or operative position.

When a new sheet record is attached to the drum as before explained, and the drum is advanced to cause the sheet record to be attached thereto and then wrapped therearound, the pin 40 strikes the left side of the abutment arm at the end of the first revolution of the drum and shifts the trip mechanism 43 in a clockwise direction through about 90° into the position which it occupies in Figure 4. Thereafter, the pin 40 will move past the trip lever 46 once during each revolution of advance movement of the drum but without imparting any movement to the abutment arm 44.

Figures 5, 6, 7, 8:
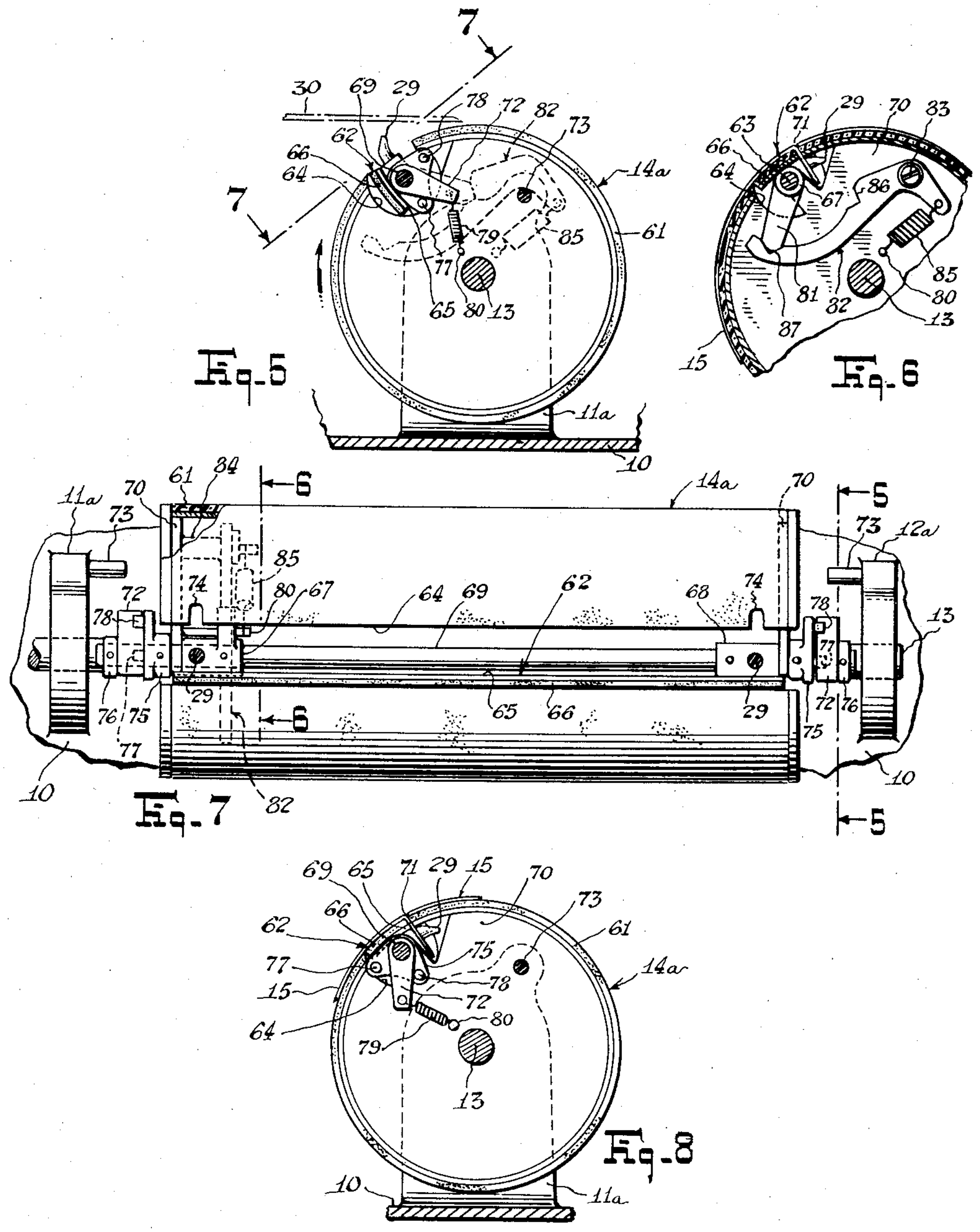
Figure 5 is a righthand view taken on the line 5—5 of Figure 7 showing a drum type of record support provided with a second form of edge-confining means according to my invention, the confining means being herein shown in open position ready for attachment of a sheet record to the support.
Figure 6 is a fractional sectional view taken on the line 6—6 of Figure 7; but showing the confining means closed.
Figure 7 is a plan view of the record-supporting drum taken on the line 7—7 of Figure 5.
Figure 8 is a righthand view of the record-supporting drum showing the confining means in closed or effective position.

In the second embodiment shown in Figures 5–8, a record support appearing again as a drum 14*a* with a resilient peripheral cover 61 is mounted on the shaft 13 itself journaled in bearings carried by the left and right standards 11*a* and 12*a*. The drum in this embodiment differs from that of the foregoing embodiment in that it has a movable longitudinal section 62—which however may be considered to be a transverse section with respect to the peripheral surface of the drum—journaled on an axis 63 within the periphery of the drum. The drum section 62 is disposed in a wide slot 64 which is suitably circular, for example, in cross section about the center 63. The drum section 62 comprises a rigid strip 65 covered with a resilient layer 66. This strip is mounted at its ends on hub members 67 and 68. These hub members are pinned to a rod 69 extending lengthwise of the slot 64 and supported at the center 63 by bearings formed in bracket plates 70 secured to the end walls of the drum. The drum section 62 may therefore pivot about the center 63 through an angular range of about 90° as between a position where it is within the slot 64 as shown in Figure 5 to a position where it closes substantially this slot except for a very narrow slit 71 as shown in Figure 6. When the drum section 62 is in the latter position, it is adapted to conform to and complete substantially the regular peripheral surface of the drum, and for this purpose it is shaped arcuately with a radius of curvature which is the same as that of the regular surface of the drum.

On the hub members 67 and 68 at right angles to the drum section 62 there are the drive pins or hooks 29. When the drum section is in innermost position shown in Figure 5, the drive pins 29 extend radially outwardly for engagement with the drive holes in the leading corner portions of a sheet record as in the manner hereinbefore described in connection with my first embodiment. However, in the continuing advance movement of the drum following the attachment of the sheet record thereto, lever arms 72 provided on the ends of the shaft 69 strike respective stationary pins 73 on the standards 11*a* and 12*a* to shift the drum section 62 through an angle of about 90° whereby to move the drive pins through respective notches 74 into concealed positions within the drum and concurrently to move the drum section outwardly into position to complete substantially the periphery of the drum. As the drum section is so moved, the drive pins carry the leading portion of the sheet record into the slot 64 while causing the sheet record to be creased on a transverse line around the leading edge of the drum section where it emerges from the drum through the slit 71.

The levers 72 have lost-motion connections to the shaft 69 allowing each lever to have a free pivotal movement on the shaft through a range of the order of 30°. This is accomplished by pivoting each lever 72 on the shaft between two collars 75 and 76 each pinned to the shaft. One of these collars is provided with two stop pins 77 and 78 positioned at opposite sides of the respective lever. The operating range of the levers 72 extends past the radius line of the drum through thhe pivot centers 63, but the levers are biased constantly to a radial position by tensioning springs 79 connected between the levers and pins 80 on the end walls of the drum. When the drum section is in its innermost position shown in Figure 5 the levers 72 bear against the pins 77 under influence of the springs 79 and then occupy positions at about 30° from the radius line just mentioned. It is from this position of the levers to a position about 60° to the other side of the radius line that the levers 72 are moved by their impingement against the pins 73 when the drum is advanced to pick up a sheet record and wrap it therearound. After having passed the pins 73, the levers 72 are retracted by the bias spring 79 against the other stop pins 78 whereupon the levers then stand about 30° from the other side of the radius line. In view of this retraction the levers are in position to strike the pins 73 and to be cammed thereover once during each revolution of advance of the drum but the movement imparted to the levers as they pass the pins 73 does not impart any movement to the drum section 62.

In order that the drum section 62 will be retained releasably in its operate positions against the biasing influence of the spring 79, a detent mechanism is provided in the form of a detent arm 81 on the hub 67, the end of which is engaged slidably by an arcuate catch plate 82 pivoted at 83 to an internal stud 84 mounted on an end wall of the drum and pressed against the detent arm by a tension spring 85. The catch plate 82 has two notches 86 and 87 spaced 90° from each other about the center 63 with the result that when the drum section is in open position the detent arm engages the notch 86 and when the drum is in closed position the detent arm engages the notch 87.

Following the feed of the leading end portion of the sheet record into the slot 64 by the movement of the drum section 62 into its closed position, the remaining portion of the sheet record is wrapped around the drum as the drum is advanced until the trailing edge comes into substantial butt relationship with the crease line of the sheet record where it emerges from the slit 71.

When the drum is reversely turned in a counterclockwise direction to cause the mounted sheet record to be stripped therefrom by the plate 30, the lever 72 will strike the pin 73 within the revolution of stripping movement and be turned 90° counterclockwise to shift the drum section from its closed position shown in Figure 8 to open position shown in Figure 5. This restores the drive pins to their radial positions for pickup and attachment of another sheet record to the drum when the drum is again advanced. Thus, as in my first embodiment, the leading portion of the sheet record is introduced automatically into a narrow slit of the drum by an advance movement of the drum to effect wrap-around of the sheet record thereon, and is disengaged automatically from this slit in response to a reverse movement of the drum to effect a removal of the sheet record therefrom.

The embodiments of my invention herein particularly shown and described are intended to be illustrative and not necessarily limitative of my invention since the same are subject to changes and modifications without departure from the scope of my invention, which I endeavor to express according to the following claims.

I claim:

1. A cylindrical record support mounted for rotation about its longitudinal axis and having a substantially continuous peripheral surface for carrying a flexible sheet record thereon in the form of an at least substantially closed loop, said support having a transverse peripheral gap for receiving the leading edge of a sheet record mounted thereon; a transverse movable member for closing said gap; fastening means comprising pins projecting from said movable member and complementary holes in the sheet record at a distance back from the leading edge thereof for receiving said pins to provide drive of the sheet record with said support as the support is advanced; and means pivotally mounting said transverse member for movement about an axis spaced from and substantially parallel to the journal axis of the support for carrying the leading edge of the sheet record into a concealed position within said support, said transverse member having a surface conforming to and forming a part of the regular peripheral surface of said support when the member is in position to conceal the leading edge of the sheet record.

2. A revolvable record support having a substantially continuous peripheral surface for carrying a flexible sheet record thereon in the form of an at least substantially closed loop; fastening means on said support for engaging the sheet record at a distance back from the leading edge thereof, said fastening means comprising pins projecting peripherally from said record support and complementary holes in the sheet record for receiving said pins; means on said support comprising a transverse peripheral gap in the support ahead of said fastening pins and a movable transverse member on the support for closing said gap for concealing the leading edge of the sheet record while the sheet record is engaged by said fastening means, said transverse member having a surface conforming to and forming part of the regular peripheral surface of said support when the member is in position to conceal the leading edge of the sheet record; means for guiding the leading edge of a sheet record into loading position for attachment to said support; and means for causing movement of said concealing means into effective position by said support as the same is advanced through a first full revolution following attachment of the sheet record thereto.

3. A revolvable record support having a substantially continuous peripheral surface for carrying a flexible sheet record thereon in the form of an at least substantially closed loop; fastening means on said support for engaging the sheet record at a distance back from the leading edge thereof to provide for drive of the sheet record with the support as the support is revolved in an advancing direction, said record support having a transverse peripheral slot circumferentially in advance of said fastening means with respect to the direction of advance movement of the support and having a movable transverse member engageable with said slot for concealing the leading edge of the sheet record in said slot while the sheet record is attached to said support by said fastening means, said transverse member having a surface completing substantially the regular peripheral surface of said support while said transverse member is engaged with said slot; means for guiding the leading portion of said sheet record into loading position for attachment to said support, said fastening means being adapted to engage said sheet record upon movement thereof past said loading position; and means responsive to advance rotation of said support for causing said concealing means to be moved into effective position when said fastening means reaches a point at a predetermined distance in advance of said loading position.

4. A revolvable record support having a substantially continuous peripheral surface for carrying a flexible sheet record thereon in the form of an at least substantially closed loop; fastening means on said support for engaging the sheet record at a distance back from the leading edge thereof to provide for drive of the sheet record with the support as the support is revolved in an advancing direction, said record support having a transverse peripheral slot circumferentially in advance of said fastening means with respect to the direction of advance movement of the support and having a movable transverse member engageable with said slot for concealing the leading edge of the sheet record in said slot while the sheet record is attached to said support by said fastening means, said transverse member having a surface completing substantially the regular peripheral surface of said support while said transverse member is engaged with said slot; means mounting said transverse member for movement away from and towards the support out of and into said slot; means for guiding the leading portion of said sheet record into a loading position for attachment thereof to said support; and means responsive to said support as the same is rotated through a first full revolution of advance movement following attachment of the sheet record thereto for causing said transverse member to be moved against the leading portion of the sheet record and into said slot, said last stated means including means responsive to said support as the same is rotated through a first full revolution of reverse movement following movement of the trailing edge of the sheet record past said loading position for causing said transverse member to be disengaged from said slot.

5. A revolvable record support having a substantially continuous peripheral surface for carrying a flexible sheet record thereon in the form of an at least substantially closed loop; a cross member journaled to said support for rotational movement between initial and advanced positions about an axis below said peripheral surface, said cross member having pins mounted thereon at opposite ends of said support projecting substantially radially outwardly from the cross member when the cross member is in initial position, said pins being adapted for engagement with complementary holes in the leading portion of the sheet record to provide for drive of the sheet record with the support as the support is advanced, said cross member being movable about said axis into an advanced position to place said pins below said peripheral surface and to feed the leading portion of the sheet record into a concealed position within the support, and said cross member having a surface adapted to complete substantially the regular peripheral surface of said support when said cross member is in said advanced position.

6. The combination set forth in claim 5 including means responsive to advance movement of said support to cause said cross member to be turned into said advanced position, and responsive to reverse movement of said support within a first revolution from any starting position sufficient for returning said cross member to initial position.

References Cited in the file of this patent

UNITED STATES PATENTS

| | | |
|---|---|---|
| 2,051,511 | Finch | Aug. 18, 1936 |
| 2,061,525 | Storck | Nov. 17, 1936 |
| 2,085,093 | Gauthier | June 29, 1937 |
| 2,653,819 | Roberts | Sept. 29, 1953 |
| 2,666,808 | Cooley | Jan. 19, 1954 |
| 2,714,010 | Gruber | July 26, 1955 |

FOREIGN PATENTS

| | | |
|---|---|---|
| 55,552 | Netherlands | Nov. 15, 1943 |